(12) United States Patent
Rossini

(10) Patent No.: US 9,625,718 B2
(45) Date of Patent: Apr. 18, 2017

(54) WINDSHIELD IMAGE DISPLAY SYSTEM

(71) Applicant: COMMISSARIAT A L'ENERGIE ATOMIQUE ET AUX ENERGIES ALTERNATIVES, Paris (FR)

(72) Inventor: Umberto Rossini, Coublevie (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 136 days.

(21) Appl. No.: 14/546,505

(22) Filed: Nov. 18, 2014

(65) Prior Publication Data

US 2015/0138614 A1 May 21, 2015

(51) Int. Cl.
*G03H 1/02* (2006.01)
*G02B 27/01* (2006.01)
*G02B 5/02* (2006.01)
*B60R 11/02* (2006.01)
*B60R 11/00* (2006.01)

(52) U.S. Cl.
CPC ...... *G02B 27/0103* (2013.01); *B60R 11/0229* (2013.01); *G02B 5/021* (2013.01); *G02B 5/0278* (2013.01); *G02B 27/0101* (2013.01); *B60R 2011/0026* (2013.01); *G02B 2027/0196* (2013.01)

(58) Field of Classification Search
CPC ........ B60R 11/0229; B60R 2011/0026; G02B 27/0103; G02B 27/0101; G02B 5/021; G02B 5/0278; G02B 2027/0196; B60K 35/00; B60K 2350/20; B60K 2350/206; G06T 3/40

USPC ......... 359/13, 599, 533, 548, 549, 292, 453, 359/456, 460, 462, 463, 649, 717, 742; 348/59; 349/15; 345/660
See application file for complete search history.

(56) References Cited

U.S. PATENT DOCUMENTS 4,481,450 A * 11/1984 Watanabe ............... E05F 15/71
15/DIG. 15
7,982,959 B1 7/2011 Lvovskiy et al.
2003/0221547 A1* 12/2003 Peretz ............... B32B 17/10018
89/36.02

(Continued)

FOREIGN PATENT DOCUMENTS

DE 4211728 10/1993
WO 2008089992 7/2008
WO 2009074638 6/2009

OTHER PUBLICATIONS

French National Institute of Industrial Property, Search Report for FR 13/61283, Jul. 7, 2014.

*Primary Examiner* — Ricky Mack
*Assistant Examiner* — Mustak Choudhury
(74) *Attorney, Agent, or Firm* — Kevin R. Erdman; Brannon Sowers & Cracraft PC

(57) ABSTRACT

A display system, including: a vehicle windshield; a projector located on the side of a first surface of the windshield and arranged to enable to project an image in the windshield, towards a second surface of the windshield opposite to the first surface, so that the angles of incidence of the rays projected on the second surface are greater than the limiting angle of total reflection of the light on the second surface; and a transmissive diffuser coating an area of the first surface located on the path of the projected rays after at least one reflection on the second surface.

20 Claims, 1 Drawing Sheet

(56) References Cited

U.S. PATENT DOCUMENTS

| | | | |
|---|---|---|---|
| 2006/0023315 A1* | 2/2006 | Robinson | G02B 5/305 359/630 |
| 2007/0090387 A1* | 4/2007 | Daniels | H01L 24/75 257/99 |
| 2010/0214635 A1* | 8/2010 | Sasaki | G02B 27/0101 359/15 |
| 2010/0260455 A1 | 10/2010 | Pascal et al. | |
| 2011/0149201 A1 | 6/2011 | Powell et al. | |
| 2013/0129282 A1* | 5/2013 | Li | G02B 6/0018 385/43 |

* cited by examiner

WINDSHIELD IMAGE DISPLAY SYSTEM

CROSS-REFERENCED TO RELATED APPLICATIONS

The present application claims priority under 35 U.S.C. §119 of French patent Application Serial Number 13/61283, filed Nov. 18, 2013, the disclosures of which are incorporated by reference herein.

BACKGROUND OF THE INVENTION

Field of the Invention

The present disclosure relates to the displaying of an image on a motor vehicle windshield.

Description of the Related Art

Systems where an image is projected, in direct projection, on a transparent diffusing film pasted on the windshield inside of the vehicle have already been provided. Such systems enable to provide an occupier of the vehicle with information overlaid to the outer scene visible through the windshield.

Existing systems however have various disadvantages. In particular, a disadvantage is that part of the light projected on the diffusing film is transmitted by this film, crosses the windshield, and is projected outside of the vehicle. This raises issues in certain applications. This particularly makes existing systems incompatible with certain vehicles, for example, military vehicles where, for confidentiality reasons, it is not acceptable for the information projected for the vehicle occupiers to be readable from the outside of the vehicle. This further makes existing systems incompatible with certain stealth vehicles where the light transmitted through the diffusing film and the windshield could make the vehicle easily detectable.

Another disadvantage of existing systems is their bulk. Indeed, the projector, located inside of the vehicle, should be placed opposite the diffusing film, at a relatively long distance from the windshield to enable to display an image of satisfactory size. This imposes positioning constraints, particularly to guarantee that no object or occupier of the vehicle intercepts the light beam during the system use. Since motor vehicle passenger compartments generally are relatively small and cluttered spaces, such positioning constraints are sometimes difficult to comply with.

It would be desirable to have a windshield image display system at least partly overcoming some of the disadvantages of existing systems.

SUMMARY OF THE INVENTION

Thus, an embodiment provides a display system comprising: a vehicle windshield; a projector located on the side of a first surface of the windshield and arranged to enable to project an image in the windshield, towards a second surface of the windshield opposite to the first surface, so that the angles of incidence of the rays projected on the second surface are greater than the limiting angle of total reflection of light on the second surface; and a transmissive diffuser coating an area of the first surface located on the path of the projected rays after at least one reflection on the second surface, wherein the projector is capable of generating an image at a distance equivalent to the distance which separates it from the diffuser, following the propagation path of light in total reflection in the windshield.

According to an embodiment, the diffuser is capable of refracting towards the outside of the windshield, on the first surface side, the light propagating in the windshield from the projector.

According to an embodiment, the diffuser is capable of transmitting, while diffusing it, the light originating from the windshield at at least one first wavelength, and of transmitting, without diffusing it, the light originating from the windshield at wavelengths other than the first wavelength.

According to an embodiment, the first wavelength is an emission wavelength of the projector.

According to an embodiment, the projector comprises a laser source.

According to an embodiment, the projector is capable of emitting light having a p-type polarization with respect to the second surface of the windshield.

According to an embodiment, the diffuser is a holographic diffuser.

According to an embodiment, the system further comprises a device for injecting, in the windshield, light emitted by the projector.

According to an embodiment, the injection device comprises a prism having a surface in contact with the first surface of the windshield.

According to an embodiment, the windshield is an armored windshield comprising a stack of a plurality of plates of a first transparent material separated two by two by layers of a second transparent material.

Another embodiment provides a motor vehicle comprising a display system of the above-mentioned type.

The foregoing and other features and advantages will be discussed in detail in the following non-limiting description of specific embodiments in connection with the accompanying drawings.

BRIEF DESCRIPTION OF THE DRAWINGS

The above mentioned and other features and advantages of this invention, either alone or in combinations of two or more, and the manner of attaining them, will become more apparent and the invention itself will be better understood by reference to the following description of embodiments of the invention taken in conjunction with the accompanying drawings, wherein.

Figure 1:
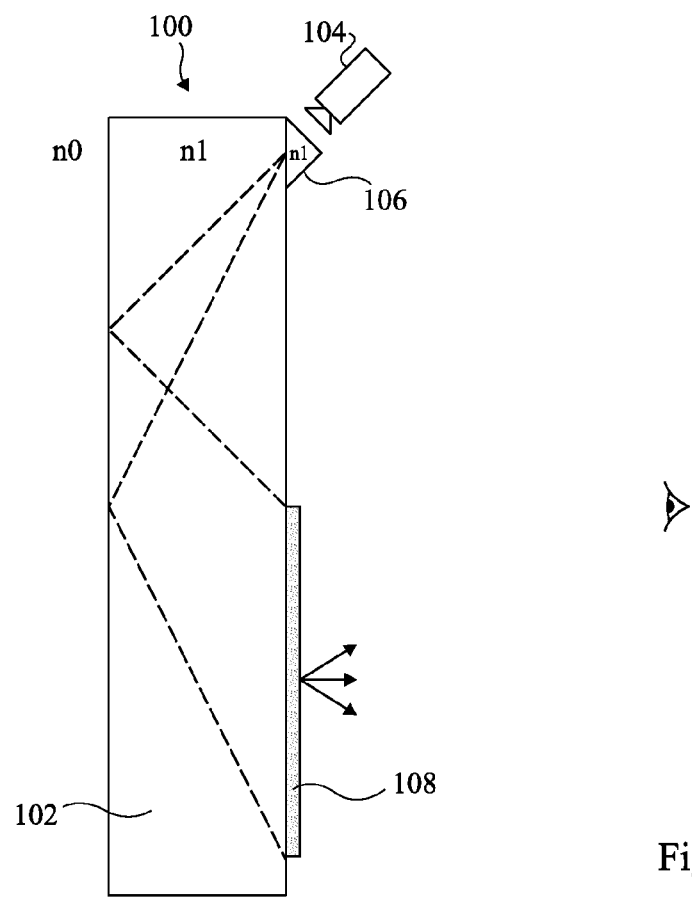
FIG. 1 is a simplified cross-section view illustrating an embodiment of a windshield image display system.

Corresponding reference characters indicate corresponding parts throughout the several views. Although the drawings represent embodiments of the present invention, the drawings are not necessarily to scale and certain features may be exaggerated in order to better illustrate and explain the full scope of the present invention. The flow charts and screen shots are also representative in nature, and actual embodiments of the invention may include further features or steps not shown in the drawings. The exemplification set out herein illustrates an embodiment of the invention, in one form, and such exemplifications are not to be construed as limiting the scope of the invention in any manner.

DETAILED DESCRIPTION

The embodiment disclosed below is not intended to be exhaustive or limit the invention to the precise form disclosed in the following detailed description. Rather, the embodiment is chosen and described so that others skilled in the art may utilize its teachings. Further, in the following description, unless otherwise indicated, terms "approximately", "substantially", "about", and "almost" mean "to within 10%". Further, in the present disclosure, unless otherwise indicated, term "transparent" is used to qualify elements, materials, films, assemblies, etc. capable of letting through, without significant deformation, the light of the visible spectrum or of almost the entire visible spectrum.

FIG. 1 is a simplified side view schematically illustrating an embodiment of a system 100 for displaying an image on a transparent windshield 102, for example a windshield attached to a motor vehicle body. In this example, system 100 comprises the actual windshield 102. Windshield 102 may have a single-layer structure or a multi-layer structure. It may comprise glass, polycarbonate, or any other transparent material adapted to the forming of a windshield. As an example, windshield 102 may be an armored windshield made of laminated glass having a thickness in the range from 7 to 10 cm, formed by stacking of a plurality of glass plates separated two by two by polyvinyl butyral (PVB) interlayers. In the example of FIG. 1, windshield 102 is considered as having a same refraction index n1 across its entire thickness, that is, windshield 102 is made of a single transparent material of index n1, or of a stack of a plurality of different materials of same index n1. In front view, windshield 102 for example has an approximately rectangular general shape. As a non-limiting example, the surfaces of windshield 102 are approximately planar and parallel to each other.

System 100 further comprises a projector 104 located inside of the vehicle, in the vicinity of an edge of the inner surface of windshield 102, that is, the surface of windshield 102 which faces the inside of the vehicle. In the shown example, projector 104 is located in the vicinity of the upper edge (in the orientation of the drawing) of windshield 102.

According to an aspect of the described embodiments, projector 104 is arranged to enable to project an image in windshield 102, towards the external surface of windshield 102 (that is, its surface facing the outside of the vehicle), so that the angle of incidence, on the outer surface of the windshield, of the light rays projected in the windshield is greater than the limiting angle of total reflection of light on the external surface of the windshield. Projector 104 may be coupled to a device for injecting and/or orienting the light projected in windshield 102. In the shown example, the injection device comprises a prism 106 made of a material of same index n1 as windshield 102, placed between projector 104 and windshield 102 and having a surface in contact with windshield 102. It will however be within the abilities of those skilled in the art to provide other devices enabling to inject an image into windshield 102 from the inside of the vehicle, so that the angle of incidence of the injected rays is greater than the limiting angle of total reflection of light on the external surface of the windshield. It should be noted that the injection device may be integrated to the windshield.

Calling n0 the optical index of the outer environment of the vehicle (generally, air), the limiting angle of total reflection, on the external surface of the windshield, of the light injected into the windshield, can be expressed with formula $\theta_1 = \arcsin(n0/n1)$. Considering a glass windshield of index n1=1.5 and an outer environment of index n0=1, angle $\theta_1$ is in the order of 41.8 degrees. As a non-limiting example, projector 104 is arranged so that all the rays of the projection cone of the image to be displayed, injected into windshield 102, reach the external surface of windshield 102 with an angle of incidence in the range from 45 to 65 degrees.

In operation, the light emitted by projector 104 and injected into windshield 102 totally reflects on the external surface of the windshield at least once.

According to another aspect of the described embodiments, system 100 further comprises a transmissive diffuser 108, coating an area of the lower surface of windshield 102 located on the path of the light injected into the windshield by projector 104, after one or a plurality (a single one in the shown example) of total reflections of the light on the external surface of windshield 102.

Diffuser 108 particularly has the function of deviating (refracting) the light injected into the windshield by projector 104, so that this light is not submitted to a total reflection on the area of the inner surface of the windshield coated with the diffuser. In the absence of diffuser 108, the light emitted by projector 104 would remain confined within windshield 102, and would keep on propagating therein in total reflection alternately on the external surface and on the internal surface of the windshield. In other words, diffuser 108 has the function of extracting from the windshield, on the inner surface side of the windshield, the image injected by projector 104.

Diffuser 108 further has the function of transmitting the extracted light towards the inside of the vehicle, by diffusing it more or less strongly. Diffuser 108 thus forms a screen on which an image generated by projector 104 may be displayed in retro-projection. The displayed image is then visible from the inside of the vehicle and invisible from the outside, diffuser 108 being only transmissive and non-reflective.

Projector 104 may be a scan projector equipped with a laser source, a miniaturized LED video projector, or any other type of adapted projector. Projector 104 for example generates an image focused at a distance equivalent to the distance which separates projector 104 from diffuser 108, following the propagation path of light in total reflection in the windshield between projector 104 and diffuser 108.

To avoid altering the vision of the external scene by the occupiers of the vehicle, diffuser 108 is preferably transparent or quasi-transparent for light originating from the outside of the vehicle. To achieve this, a transmissive diffuser 108 only active in one or a plurality of restricted wavelengths, corresponding to emission wavelengths of projector 104, is preferably selected. As an example, diffuser 108 is active only in a spectral band having a full width at half maximum smaller than 50 nm. For the other wavelengths, diffuser 108 is transparent and does not diffuse the light originating from the windshield. In a preferred embodiment, projector 104 and diffuser 108 are monochromatic. Preferably, the wavelengths at which diffuser 108 is active are wavelengths which are little or not present in the outer scene. Diffuser 108 is for example a holographic diffuser, that is, it is formed by holographic recording of an optical function on a photosensitive plate. The holographic recording of the diffuser element is preferably performed at the same wavelength as that of projector 104. The photosensitive plate is preferably made of a photo-refractive material, that is, a material having its optical index varying according to the intensity with which it has been illuminated. The interference fringes formed during the holographic recording thus create index variations in the photosensitive plate, which will enable to subsequently reproduce the recorded optical function. As an example, during the holographic recording, an assembly of a plurality of Bragg mirrors is created in the photosensitive plate, enabling to subsequently reproduce the desired diffusion function.

As a non-limiting example of sizing of the system of FIG. 1, considering a windshield having a height of approximately 420 mm and a thickness of approximately 95 mm, a screen angle of the image in the windshield forming angles of incidence on the rear windshield surface ranging from 45 to 60 degrees, and a system with a single total reflection of the image on the external surface of the windshield, an image having a height of approximately 140 mm located in the lower half of the windshield can be displayed on the lower surface of the windshield. It should be noted that in practice, the number of total reflections on the external surface of the windshield, and/or the aperture of the screen angle of the image in the windshield may be adjusted according to the dimensions of the windshield and/or to the desired size of the display area.

Figure 2:
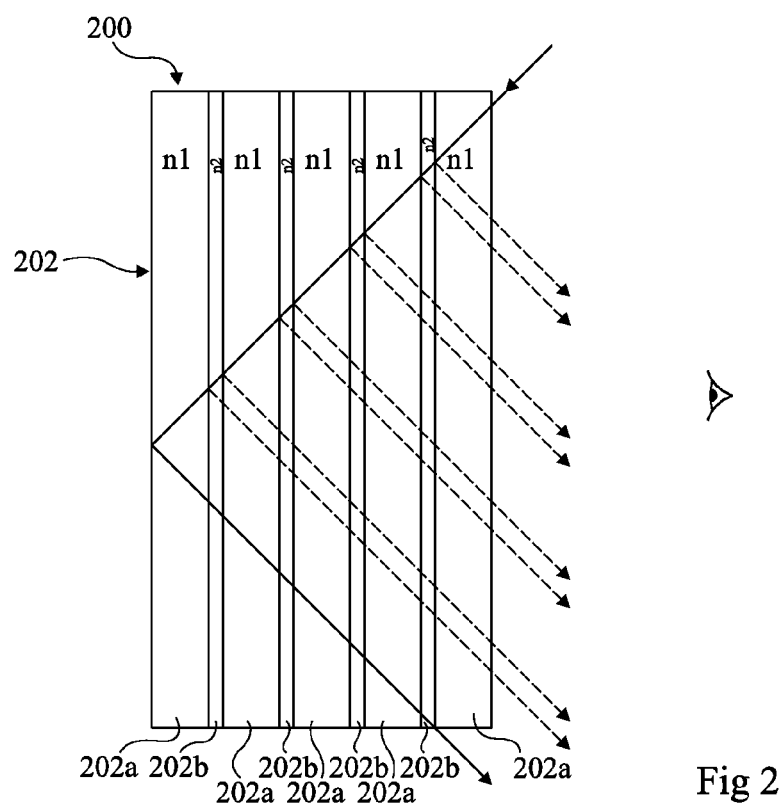
FIG. 2 is a partial simplified cross-section view illustrating in further detail the operation of an embodiment of a windshield image display system.

FIG. 2 is a partial simplified cross-section view illustrating in further detail the operation of an embodiment of a system 200 for displaying an image on a windshield 202. The system of FIG. 2 differs from the system of FIG. 1 only by the nature of windshield 202. The other elements of the system of FIG. 2 may be similar or identical to what has been described in relation with FIG. 1, and will not be described again hereafter.

In the example of FIG. 2, windshield 202 is a laminated glass windshield formed of a stack of a plurality of plates 202a of a first transparent material, for example, glass, separated two by two by interlayers 202b made of a second transparent material, for example, polyvinyl butyral (PVB). In the example of FIG. 2, conversely to what has been considered in the example of FIG. 1, plates 202a and layers 202b do not have strictly the same refraction index. Indeed, although multi-layer structure windshields are generally made of materials having optical indexes as close as possible to one another, there may remain a slight index difference between the different materials used. In this example, n1 designates the optical index of plates 202a, and n2 designates the optical index of interlayers 202b.

As shown in dotted lines in FIG. 2, the light rays injected into the windshield by projector 104 (not shown in FIG. 2) are capable of undergoing parasitic reflections at the successive interfaces between the plates of index n1 and the layers of index n2.

To minimize such parasitic reflections, a projector emitting light of p-type polarization with respect to the successive interface planes between the plates of index n1 and the layers of index n2, that is, light rectilinearly polarized along a direction parallel to these planes, is used. Indeed, p-type polarized light is less subject to parasitic reflections than s-type polarized light, that is, light rectilinearly polarized along a direction orthogonal to interface planes n1/n2 or n2/n1. It should be noted that, at the Brewster angle of diopters n1/n2 or n2/n1, the parasitic reflections of the p-type polarized light cancel. The Brewster angle is provided by formula $\theta_{B1}=\arctan(n2/n1)$ for diopter n1/n2, and $\theta_{B2}=\arctan(n1/n2)$ for diopter n2/n1. As an example, if n1=1.49 and n2=1.47, then the Brewster angle for a ray propagating from medium n1 to medium n2 is in the order of 44.6 degrees and the Brewster angle for a ray propagating from medium n2 to medium n1 is in the order of 45.4 degrees. As it is drawn away from the Brewster angle, the parasitic reflection coefficient progressively increases. To minimize parasitic reflections, it may be decided to restrict the angle of aperture of the projection beam of the image in the windshield, so that the reflection coefficient of the p-type polarized light on diopters n1/n2 or n2/n1 does not exceed a given threshold, for example, in the order of 0.03%. In the above-mentioned example with n1=1.49 and n2=1.47, the 0.03% coefficient is reached for angles of incidence of approximately 60 degrees. If the difference between indexes n1 and n2 decreases, it may be provided to increase the aperture of the screen angle, and thus the size of the displayed image.

An advantage of the described embodiments is that they enable to display, on a motor vehicle windshield, information for the vehicle occupiers, without for the light used to display this information to be detectable outside of the vehicle, and without for the information originating from the outside to be significantly altered.

Another advantage is the small bulk of the display system. Indeed, in the described embodiments, the projector may be arranged in the immediate vicinity of the windshield, for example, at the level of an edge of the windshield, without it being necessary to provide a significant distance between the projector and the windshield.

Specific embodiments have been described. Various alterations, modifications, and improvements will occur to those skilled in the art. In particular, the described embodiments are not limited to the above-mentioned numerical sizing examples.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A display system comprising:
    a vehicle windshield;
    a projector located on the side of a first surface of the windshield and arranged to enable to project an image in the windshield, towards a second surface of the windshield opposite to the first surface, so that the angles of incidence of the rays projected on the second surface are greater than the total reflection angle of light on the second surface; and
    a transmissive diffuser coating and contacting an area of the first surface located on the path of the projected rays after at least one reflection on the second surface, the diffuser being adapted to extract the projected rays from the windshield,
    wherein the projector is capable of generating an image at a distance equivalent to the distance which separates it from the diffuser, following the propagation path of light in total reflection in the windshield.

2. The system of claim 1, wherein the diffuser is capable of refracting towards the outside of the windshield, on the first surface side, the light propagating in the windshield from the projector.

3. The system of claim 1, wherein the diffuser is capable of transmitting, by diffusing the light originating from the windshield in at least one first wavelength, and of transmitting, without diffusing the light originating from the windshield at wavelengths other than said at least one first wavelength.

4. The system of claim 3, wherein said at least one first wavelength is an emission wavelength of the projector.

5. The system of claim 1, wherein the projector comprises a laser source.

6. The system of claim 1, wherein the projector is capable of emitting light having a p-type polarization with respect to the second surface of the windshield.

7. The system of claim 1, wherein the diffuser is a holographic diffuser.

8. The system of claim 1, further comprising a device of injection, into the windshield, of the light emitted by the projector.

9. The system of claim 8, wherein the injection device comprises a prism having a surface in contact with the first surface of the windshield.

10. The system of claim 1, wherein the windshield is an armored windshield comprising a stack of a plurality of plates of a first transparent material separated two by two by layers of a second transparent material.

11. A motor vehicle comprising:
a vehicle body;
a vehicle windshield attached to the vehicle body;
a projector located on the side of a first surface of the windshield and arranged to enable to project an image in the windshield, towards a second surface of the windshield opposite to the first surface, so that the angles of incidence of the rays projected on the second surface are greater than the total reflection angle of light on the second surface; and
a transmissive diffuser coating and contacting an area of the first surface located on the path of the projected rays after at least one reflection on the second surface, the diffuser being adapted to extract the projected rays from the windshield,
wherein the projector is capable of generating an image at a distance equivalent to the distance which separates it from the diffuser, following the propagation path of light in total reflection in the windshield.

12. The motor vehicle of claim 11, wherein the diffuser is capable of refracting towards the outside of the windshield, on the first surface side, the light propagating in the windshield from the projector.

13. The motor vehicle of claim 11, wherein the diffuser is capable of transmitting, by diffusing the light originating from the windshield in at least one first wavelength, and of transmitting, without diffusing the light originating from the windshield at wavelengths other than said at least one first wavelength.

14. The motor vehicle of claim 13, wherein said at least one first wavelength is an emission wavelength of the projector.

15. The motor vehicle of claim 11, wherein the projector comprises a laser source.

16. The motor vehicle of claim 11, wherein the projector is capable of emitting light having a p-type polarization with respect to the second surface of the windshield.

17. The motor vehicle of claim 11, wherein the diffuser is a holographic diffuser.

18. The motor vehicle of claim 11, further comprising a device of injection, into the windshield, of the light emitted by the projector.

19. The motor vehicle of claim 18, wherein the injection device comprises a prism having a surface in contact with the first surface of the windshield.

20. The motor vehicle of claim 11, wherein the windshield is an armored windshield comprising a stack of a plurality of plates of a first transparent material separated two by two by layers of a second transparent material.

* * * * *

UNITED STATES PATENT AND TRADEMARK OFFICE
CERTIFICATE OF CORRECTION

PATENT NO. : 9,625,718 B2
APPLICATION NO. : 14/546505
DATED : April 18, 2017
INVENTOR(S) : Umberto Rossini Page 1 of 1

It is certified that error appears in the above-identified patent and that said Letters Patent is hereby corrected as shown below:

On the Title Page

Item (60) Related Foreign Application Data please insert --FR 13/61283 November 18, 2013--.

Signed and Sealed this
Thirty-first Day of July, 2018

Andrei Iancu
*Director of the United States Patent and Trademark Office*